United States Patent [19]

Ishigaki

[11] Patent Number: 4,953,178
[45] Date of Patent: Aug. 28, 1990

[54] SPREAD SPECTRUM COMMUNICATION SYSTEM

[75] Inventor: Yukinobu Ishigaki, Machida, Japan

[73] Assignee: Victor Company of Japan, Ltd., Yokohama, Japan

[21] Appl. No.: 408,262

[22] Filed: Sep. 18, 1989

[30] Foreign Application Priority Data

Sep. 16, 1988 [JP] Japan ................................. 63-233303

[51] Int. Cl.$^5$ ............................................. H04K 1/00
[52] U.S. Cl. ....................................................... 375/1
[58] Field of Search ............................... 375/1; 380/34

[56] References Cited

U.S. PATENT DOCUMENTS

| | | | |
|---|---|---|---|
| 4,163,944 | 8/1979 | Chambers et al. | 375/1 |
| 4,164,628 | 8/1979 | Ward et al. | 375/1 |
| 4,809,296 | 2/1989 | Braun et al. | 375/1 |
| 4,879,726 | 11/1989 | Kobayashi et al. | 375/1 |

Primary Examiner—Salvatore Cangialosi
Attorney, Agent, or Firm—Fleit, Jacobson, Cohn, Price, Holman & Stern

[57] ABSTRACT

There is disclosed a spread spectrum communication system comprising a modulation unit provided in the transmission side for transmitting a composite spread spectrum signal after modulating an information signal by the first and second carrier, and a demodulation unit in the reception side having an automatic gain control (AGC) function and for demodulating a primary-modulated signal by spread code generated therein or despreading. The demodulating unit comprises an input circuit for receiving the composite spread spectrum signal, a control circuit for controlling a level of the composite spread spectrum signal, a separating circuit for separating a spread code signal and a spread spectrum signal from the composite signal, a circuit for generating the primary-modulated signal based on the spread code, a detecting circuit for detecting an envelope signal of the demodulated primary-modulated signal from the generating circuit, a converting circuit for converting the envelope signal into a control signal, and a supplying circuit for supplying the control signal to the control circuit.

5 Claims, 6 Drawing Sheets

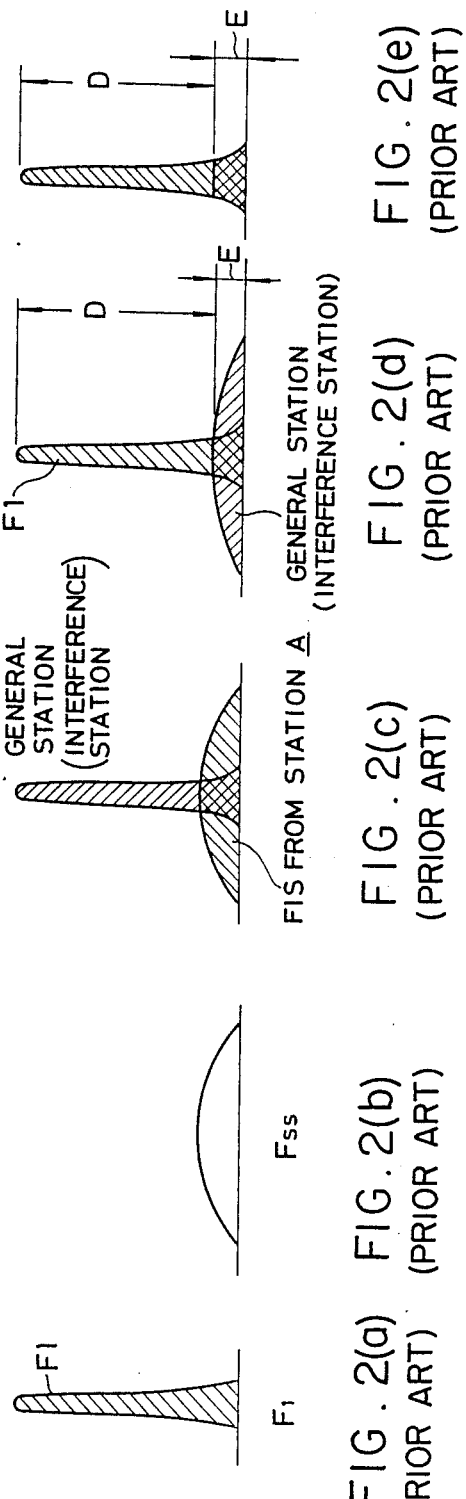

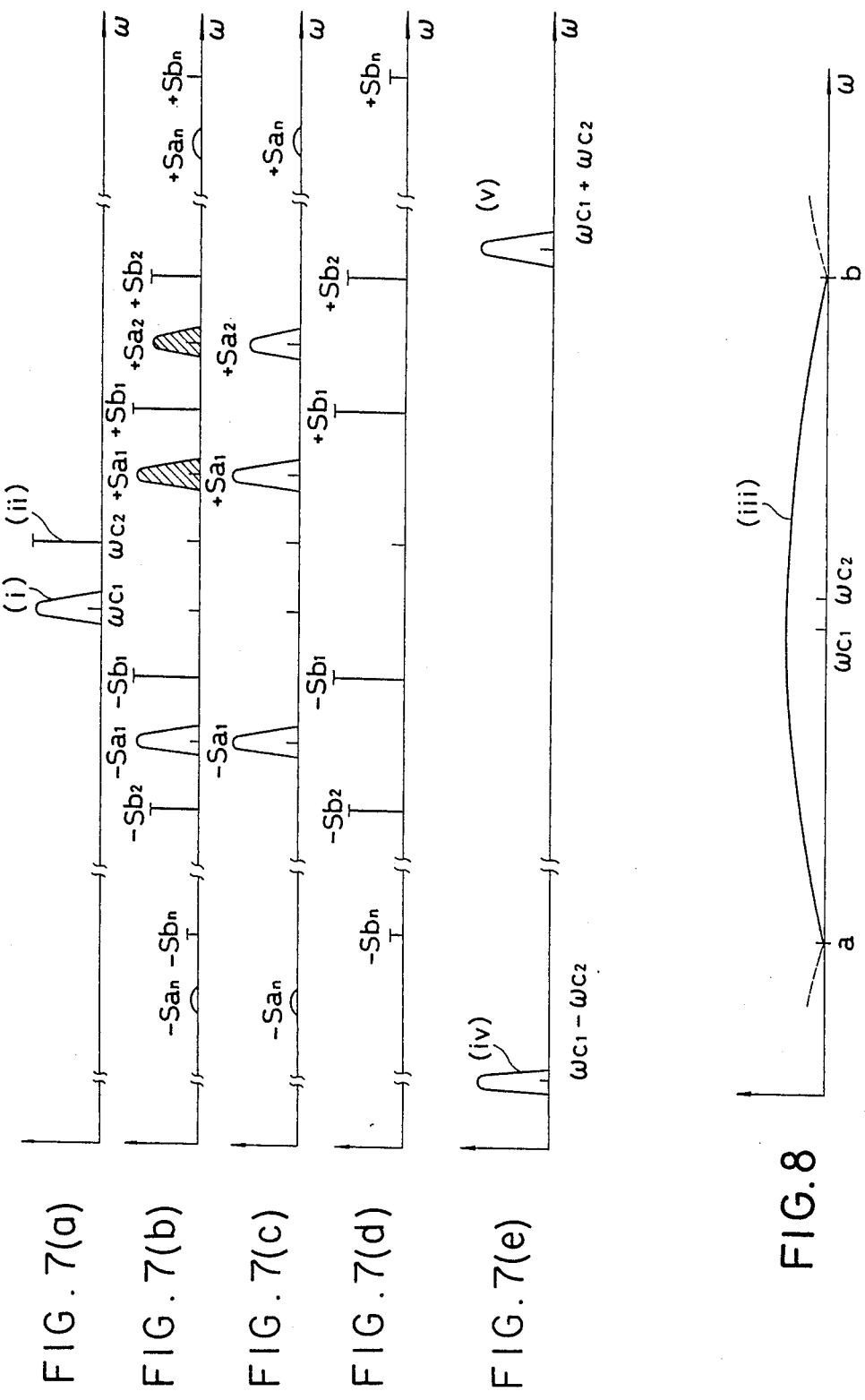

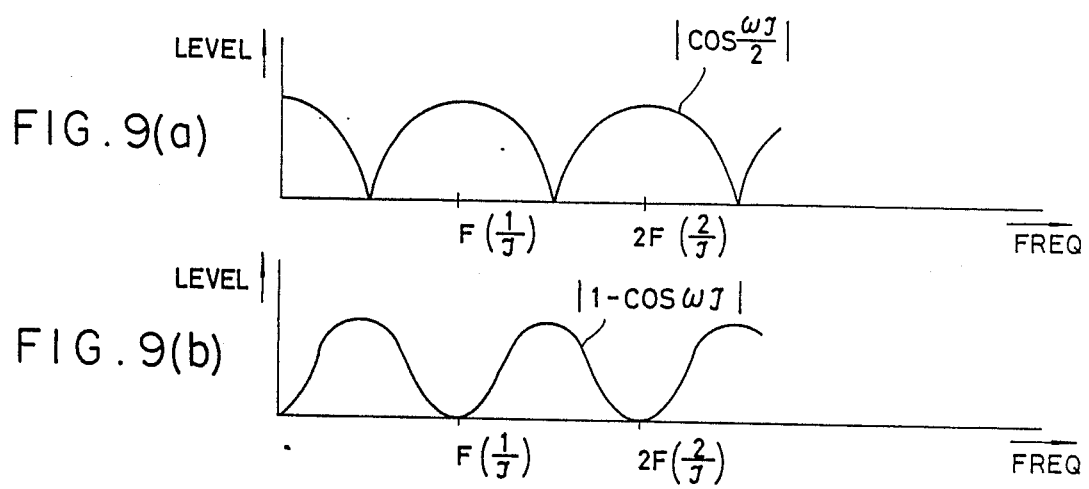
FIG. 9(a)
FIG. 9(b)
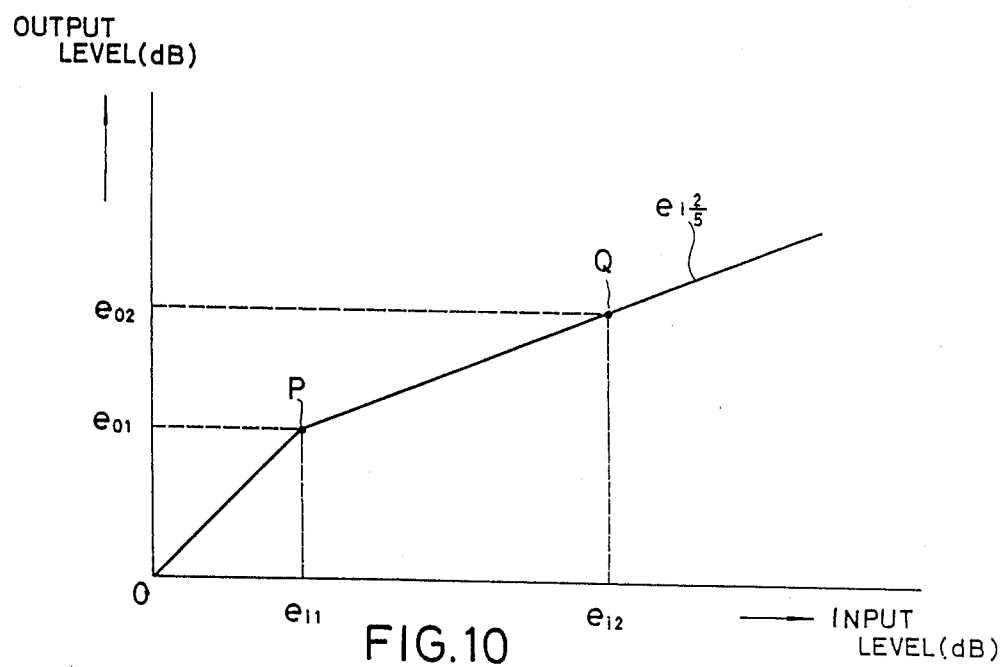
FIG. 10

SPREAD SPECTRUM COMMUNICATION SYSTEM

BACKGROUND OF THE INVENTION

The present invention relates to a spread spectrum communication system, and more particularly, to a spread spectrum communication system which does not need to comprise a spread code generation circuit at a receiving (demodulating) side for generating a despreading pseudonoise, but comprises an automatic gain control (AGC) means most suitable thereto.

According to the spread spectrum communication system, a carrier is primary modulated by an information signal, and the primary modulated carrier undergoes secondary modulation by a wide band noise-like spread code so as to spread it over a very wide bandwidth. Various spread spectrum communication systems are known such as a direct sequence (DS) system, frequency hopping (FH) system, hybrid system and the like, depending upon the secondary modulation scheme. The present invention beyonds to the DS system. A spread spectrum communication system has a number of advantages as in the following:

(1) High security and privacy protection;
(2) High immunity to external interference and noise, and to intentional disturbance;
(3) Compatibility with conventional communication systems;
(4) No control station and control channel are required unlike a multichannel access (MCA) station;
(5) Capability of identifying station by using address codes;
(6) Seemingly no radio signal transmission in the spectrum due to low power distribution of the DS system (Capability of transmitting radio signal with thinly spread power);
(7) Capability of increasing a number of stations in the given band with trade-off of a slight degradation of speech quality; and
(8) Capability of multiplex operation in the same frequency band by changing pseudo noise codes.

Taking the above advantages into account, the spread communication systems are now widely applied not only to commercial communications but also to consumer use.

Referring to FIGS. 1 and 2, there will be described the fundamental principle of spread spectrum communication system having an AGC circuit at the receiving side. FIG. 1 is a block diagram showing the basic arrangement of a conventional spread spectrum communication system according to a DS system, and FIG. 2 shows spectrum waveforms at various circuit portions of the conventional system shown in FIG. 1.

As shown in FIG. 1, a station A as a transmission side comprises a primary modulator 1 which primarily modulates a carrier with an information signal and outputs a primary modulated signal $F_1$ shown in FIG. 2(a), a spread code generator 2 for generating spread code signal $F_{SS}$ shown in FIG. 2(b) such as pseudo noise (PN) codes, a spread modulation circuit 3 which secondarily modulates the primary modulated signal $F_1$ by the spread codes supplied from the generator 2, and an antenna $A_1$ for output of a transmission signal $F_{1S}$ after amplification by secondary modulation of the circuit 3. The type of primary modulations is not particularly limited, but frequency modulation (FM), phase shift keying (PSK) and the like may be adopted (in this specification, the description is assumed to use PSK modulation). For the secondary modulation (spread modulation), PSK modulation is generally performed using pseudo noise (PN) code. It is required for the PN code to be like random noise as much as possible, and to have a predetermined code period for detecting the code at the receiving side.

Numeral 4 represents a general station transmitting a radio wave $F_n$ as an interference wave.

Next, a station B as the receiving side comprises an antenna $A_2$ for receiving signals $F_{1S}$ to $F_{3S}$ and $F_n$, an AGC circuit 5 for setting the signal $F_{1S}$ after filtering and amplification by a filter and high-frequency amplifier at the predetermined level, a despread (spread) code generator 6 for generating spread codes to be used for despreading the received signal, a despread (spread) circuit 7 for despreading the received signal from the AGC circuit 5 in accordance with the spread codes, a filter 8 for passing the frequency components of preferably a specific narrow band of an output from the despreading circuit 7, and a demodulator 9 for demodulating an output from the filter 8 and outputting an information signal.

The despread code generator 6 is in synchronization with the spread code generator 2 of the station A, and the same PN code ($F_{SS}$) is used. Radio waves incoming to the antenna $A_2$ include not only the radio wave $F_{1S}$ but also radio waves $F_{2S}$, $F_{3S}$, ..., from other SS stations and the radio wave $F_n$ from the general station other than the other SS stations, as shown in FIG. 2(c). In order to explain briefly, the function will be described when the radio wave $F_n$ is simultaneously received with the radio wave $F_n$ from the general station 4.

The spectrum shown in FIG. 2(a) is restored from the desired radio wave $F_{1S}$ shown in FIG. 2(d) by means of despreading the wave $F_{1S}$ by the despread circuit 7, and at the filter (the narrow band pass filter is required) 8, components other than $F_{1S}$ (refer to FIG. 2(e)). Then, original information signal is demodulated at the demodulator 9 is removed. As seen from FIG. 2(e), the output signal from the filter 8 includes not only the waveform $F_{1S}$ but also a fraction of the interference radio wave $F_n$. The ratio of the desired signal power to the residual power of the interference (less residual power is preferred) is called the DN ratio (a ratio of desired signal power to interference power). In order to obtain a larger DN ratio, the spread bandwidth should advantageously be as wide as possible. The spread bandwidth is generally set at several hundreds to several thousands of times as wide as the frequency bandwidth of the information signal to be transmitted.

The basic principle of the spread spectrum communication system has been described before. Next, the particular operation will be theoretically described for primary and secondary modulation and demodulation during the spread spectrum communication. A spread spectrum signal S(t) ($F_{1S}$ shown in FIG. 1) for spread spectrum communication is given by the following equation, taking the information data as "d(t)[+1 or −1]", the spread code $F_{SS}$ as "P(t)[+1 or −1]", and the carrier as "$\cos\omega_c t$":

$$S(t) = d(t) \cdot P(t) \cdot \cos\omega_c t \ldots \quad (1)$$

(where $\omega_c = 2\pi f c$)

At the receiving side, the incoming spread spectrum signal S(t) is transformed into a two-phase PSK signal such as "$d(t)\cdot\cos\omega_c t$" by multiplying (or correlating, despreading) it by the spread code P(t). The spread code P(t) (actually $\hat{P}(t)$ with a slight delay) is obtained, the spread code P(t) is principly synchronized with the spread code associated with the spread spectrum signal at the time of transmission, by using a spread code clock derived from the incoming spread spectrum signal. The obtained two-phase PSK signal is multiplied by the reproduced carrier "$\cos\omega_c t$" (actually $\widehat{\cos\omega_c t}$ with slight delay) for synchronous detection to obtain as follows:

$$d(t)(\cos\omega_c t)^2 = d(t)(1+\cos 2\omega_c t)/2.$$

After removing the double carrier component "$2\omega_c t$" by the filter, the information data d(t) are demodulated.

The process gain $G_P$ of the spread spectrum communication is given by:

$$G_P = B_P/B_D \ldots \qquad (2)$$

where $B_D$ denotes the bandwidth (main lobe of the spectrums) of the two-phase PSK signal "$d(t)\cos\omega_c t$", and $B_P$ denotes the bandwidth (main lobe of the spectrums) of the spread spectrum signal spread by the spread code P(t). The process gain $G_P$ is several hundreds to several thousands for the case of an ordinary design. Suppression of interference signals, noises and the like depends upon the process gain. Thus, the wider the frequency bandwidth of the spread spectrum signal is set to the information data d(t), the larger the improvement of the interference signals, noises and the like that can be obtained. Such improvement therefore depends substantially and exclusively upon the process gain $G_P$.

In the spread spectrum communication system, "despreading" at the receiving side is the most important, but it is difficult to generate a reliable spread code required in performing such despreading. Despreading methods presently adopted in general include a despreading method using an AFC loop, delay locked loop and multiplier, and a despreading method using a synchronous loop of matched filter and multiplier.

However, the above-described despreading methods for the conventional spread spectrum communication system, pose the problem of having a complicated circuitry, and problems associated with circuit adjustment and cost effectiveness. These problems must be solved for allowing various applications to and developments in consumer devices and apparatus.

Furthermore, the conventional communication system has the configuration in which the AGC circuit 5 is arranged at the preceding stage of the despread circuit 7 in order to maintain stable operation when the system is especially adapted to the device and apparatus for field use. If there are other signals having a stronger field strength than the spread spectrum (SS) signals to be received, it is difficult to properly control the SS system for the signals because the AGC circuit 5 responses to these other signals.

SUMMARY OF THE INVENTION

In order to solve the above-mentioned problems, an object of the present invention is to provide a spread spectrum communication system capable of simplifying the whole circuitry and reducing the manufacturing cost, and applicable to civil consumer devices and apparatus.

Another object of the present invention is to provide a spread spectrum communication system capable of precisely controlling the spread spectrum signals even though the stronger other signals are received by the AGC circuit.

To achieve the above objects, the spread spectrum communication system according to the present invention having a modulation unit for transmitting a radio wave including information data and a demodulating unit for receiving the radio wave and picking up the information data, is constructed so that the modulation unit comprises means for obtaining a primary modulated signal by modulating a first carrier by an information signal, means for obtaining a secondary modulated signal by adding a second carrier to the primary modulated signal, means for generating a spread code signal on the basis of an input clock signal, and means for obtaining a composite spread spectrum signal which is composed of the secondary modulated signal and the spread code signal by the multiplication; and the demodulation unit comprises means for inputting the composite spread spectrum signal, means for automatically controlling a level of the composite spread spectrum signal responsive to a control signal, a separating circuit for separating the secondary modulated signal and the spread code signal from the composite spread spectrum signal, means for generating the primary modulated signal by despreading the secondary modulated signal based on the spread code signal respectively input from the separating circuit by the multiplication, detection means for receiving the primary modulated signal obtained by demodulation and for detecting the envelope signal of the primary modulated signal, conversion means for converting the envelope signal into a control signal by means of a smoothing circuit for giving a moderate integral time constant to the envelope signal, and means for supplying the control signal to the control means.

As described above, the spread spectrum communication system of the present invention functions as follows.

The modulation unit of the system generates the spread code signal for the spread modulation. The spread code signal is inserted between the spectra of the spread spectrum signal as the frequency to be output. In the demodulation unit of the system, after a divider circuit having an AGC function sets the received signal to the predetermined level, the received signal is separately detected into the spread spectrum signal and the spread modulation code signal. A primary demodulation signal is separately detected by a filter after despreading both the signals by the multiplication so that an AGC system operates the divider circuit responsive to a produced control signal depending upon the level of the primary demodulation signal.

Accordingly, as the demodulation unit does not have a clock reproduction circuit, a synchronous pull-in circuit in a form of loop and hold circuit, the despread code generator and the like which are indispensable components in the conventional demodulation unit, the primary demodulation signal is excellently demodulated by setting the despread output at a nearly constant level. To achieve the above-mentioned object, it is possible to prevent erroneous operation of the AGC system caused by interference signals.

Since the spread spectrum communication system according to the present invention has a configuration and operates as described in the foregoing for a communication of the spread spectrum signals including information data between the modulation unit and the demodulation unit, the system of this invention has various advantageous features as in the following:

(1) As the circuitry is considerably simplified without the necessity of a clock reproducing circuit, a spread code generator, a looped synch-pull-in circuit, a synch-holding circuit and the like which are essential elements for the demodulation unit of the conventional system, the present invention system allows various applications and developments to consumer devices and apparatus and the manufacturing cost can be reduced accordingly.

(2) Due to the lack of the synch-pull-in circuit and synch-holding circuit the present invention system enables a stable despreading operation without a slow synchronous pull-in or miss of synchronization.

(3) A malfunction of an AGC circuit which is inherent to the conventional system is prevented in the present invention system, because the control signal (voltage) for the AGC system of the present invention is generated on the basis of the demodulated primary modulation signal of which interference signals, noise and the like are already suppressed.

(4) The present invention system enables a stable despreading operation of the spread spectrum signals by a quick response of the AGC system even when the spread spectrum signal is interrupted, because the control signal has instantaneous rising characteristics and appropriate recovery characteristics.

(5) The present invention system enables a stable despreading operation of the spread spectrum signal by further improving compression characteristics of the AGC system comprising a multiplier operated in a square-law configuration for the detection of the envelope signal.

BRIEF DESCRIPTION OF THE DRAWINGS

In the accompanying drawings:

FIGS. 2(a)-2(e) shows spectrums of the output signals at several portions of the conventional system shown in FIG. 1;

FIGS. 7(a)-7(e) frequency spectrums for explaining operation at several portions of the above embodiment shown in FIG. 1;

FIG. 8 is a waveform diagram showing the spread spectrum signal;

FIGS. 9(a) and 9(b) are diagrams showing the amplitude and frequency characteristics of the branching filter shown in FIG. 5; and FIG. 10 is a diagram showing the compression characteristic of the AGC circuit.

DETAILED DESCRIPTION OF THE PREFERRED EMBODIMENTS

There will now be described in detail the preferred embodiment of the spread spectrum communication system according to this invention and with reference to the accompanying drawings.

Figure 1:
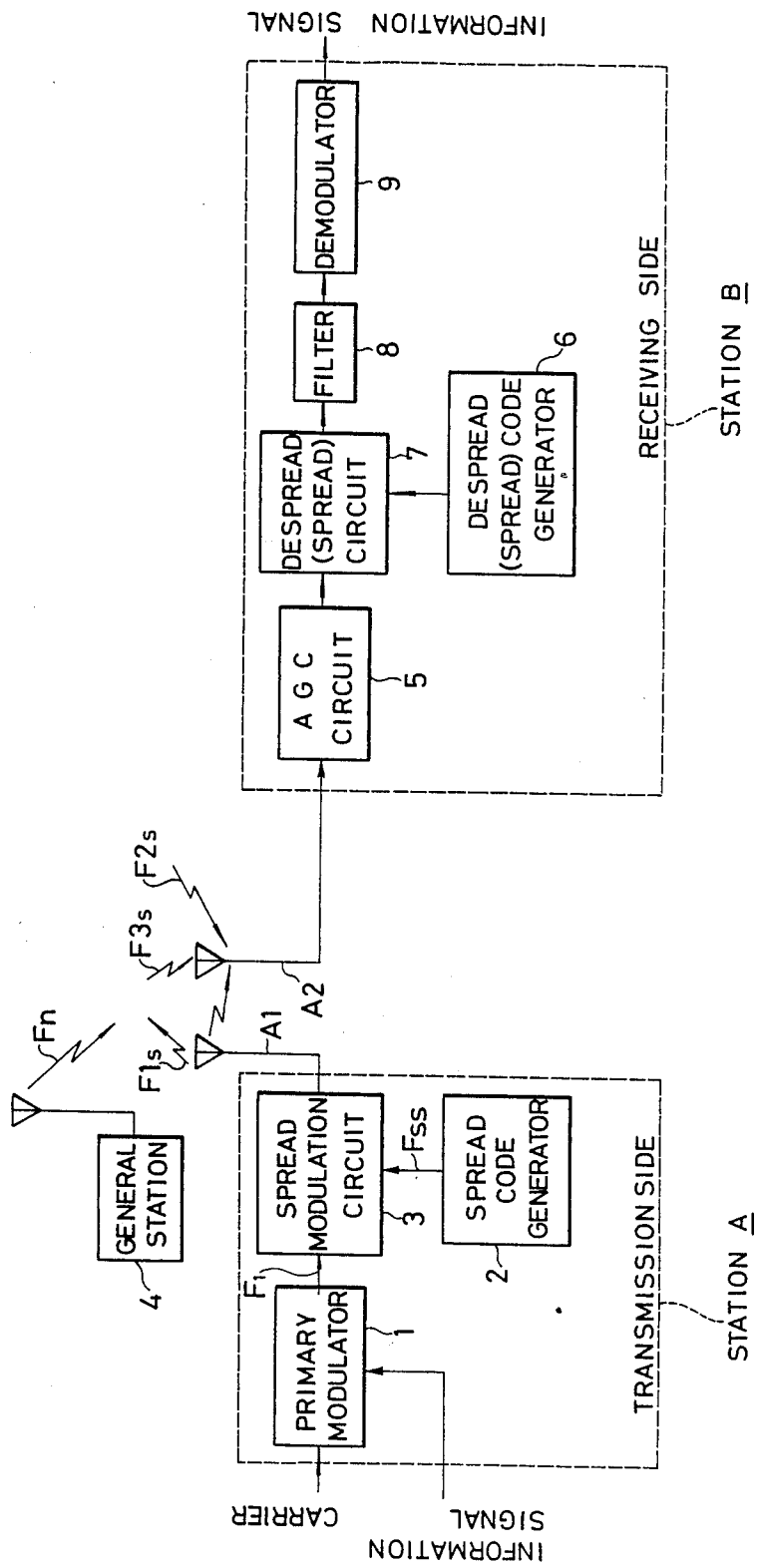
FIG. 1 is a block diagram showing the basic arrangement of a conventional spread spectrum communication system.
Figure 3A:
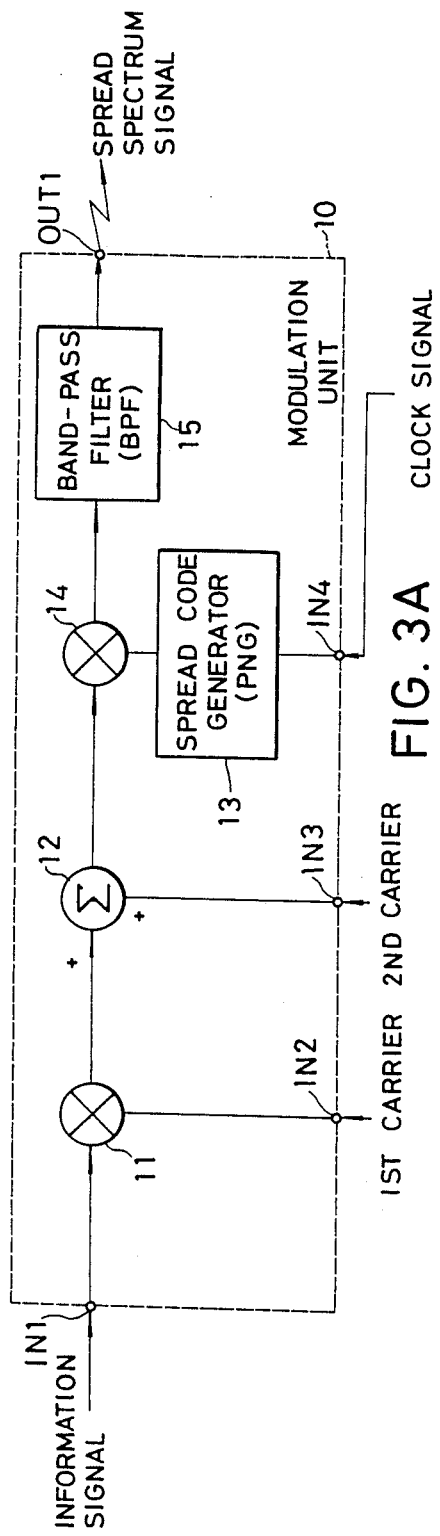
FIGS. 3A and 3B are block diagrams showing the modulation unit and demodulation unit of a spread spectrum communication system according to one embodiment of the present invention.
Figure 3B:
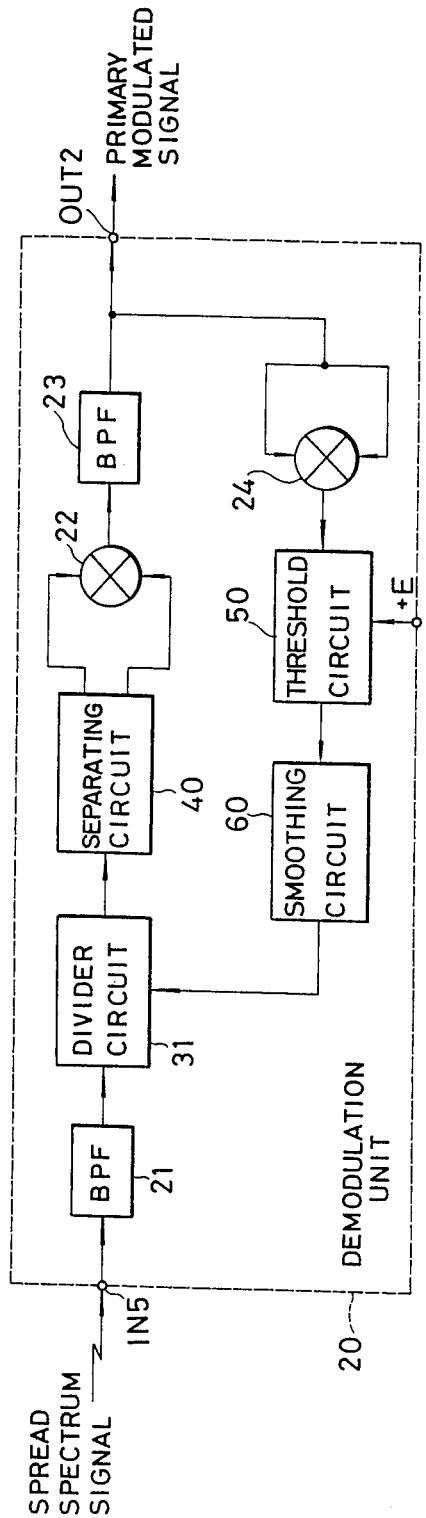

FIGS. 3A and 3B are block diagrams showing an embodiment of a spread spectrum communication system of the present invention. FIG. 3A shows a modulation unit 10 at the transmission side while FIG. 3B shows a demodulation unit 20 at the reception side. In these figures, some of the elements such as antennas are omitted.

As shown in FIG. 3A, the modulation unit 10 comprises a multiplier 11, an adder 12, a spread code generator (hereinafter simply called PNG—pseudo noise generator 13, a multiplier 14, and a band pass filter (BPF) 15, which are respectively interconnected as shown in the figure. The demodulation unit 20 comprises a BPF 21, a multiplier 22, a BPF 23, a multiplier 24, a divider circuit 31, a separating circuit 40, a threshold circuit 50, and a smoothing circuit 60, respectively interconnected as shown in FIG. 3B. An AGC loop 30 included in the circuitry of the demodulation unit 20 is represented by FIG. 4.

Figure 4:
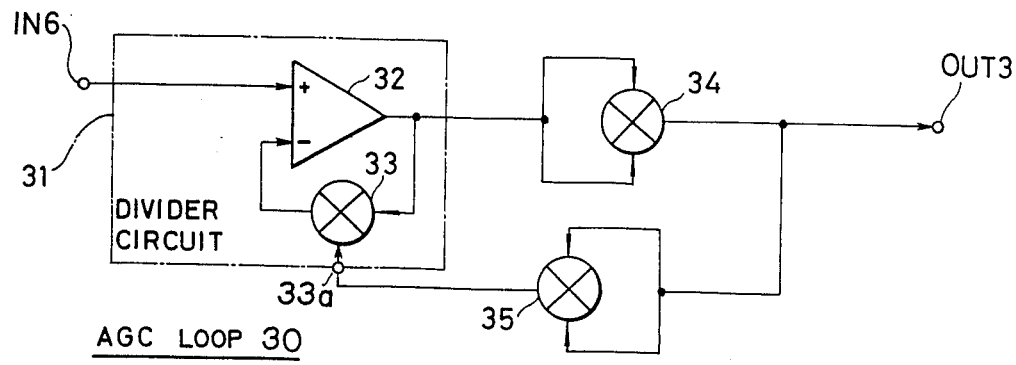
FIG. 4 is an AGC loop which is one of the main portions of the demodulation unit.
Figure 5:
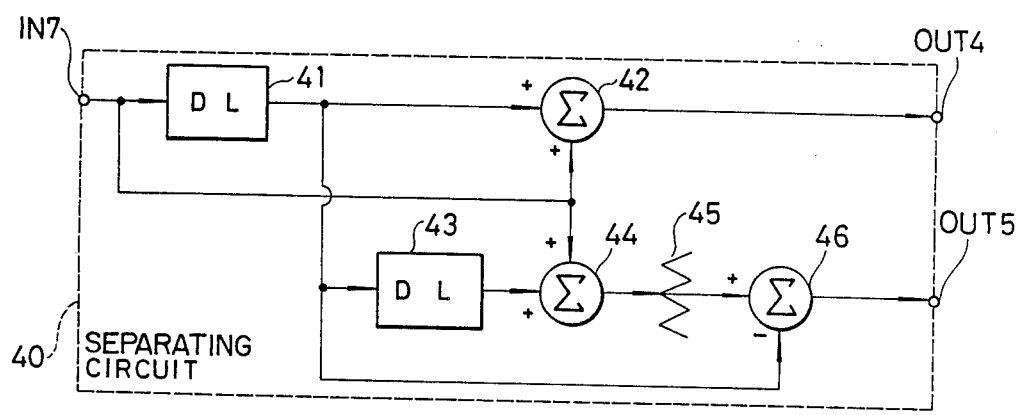
FIG. 5 is a circuit diagram concretely showing a separation filter which is also one of the main portions of the demodulation unit.

The AGC loop 30 comprises the divider circuit 31 having an operational amplifier 32 and a multiplier 33, and multipliers 34 and 35 interconnected as shown in FIG. 4 represent respectively the multipliers 22 and 24 in the demodulation uniot 20. A comb-filter shown in FIG. 5 is used as the concrete configuration of the separating circuit 40 which comprises delay circuits 41 and 43, adders 42 and 44, a gain regulator 45, and a subtractor 46, respectively interconnected as shown in FIG. 5. FIGS. 9(a) and 9(b) are diagrams showing amplitude-frequency characteristics such as adding and subtracting characteristics, wherein FIG. 9(a) shows those of the adder 42 side and FIG. 9(b) shows those of the subtracter 46 side.

Figure 6:
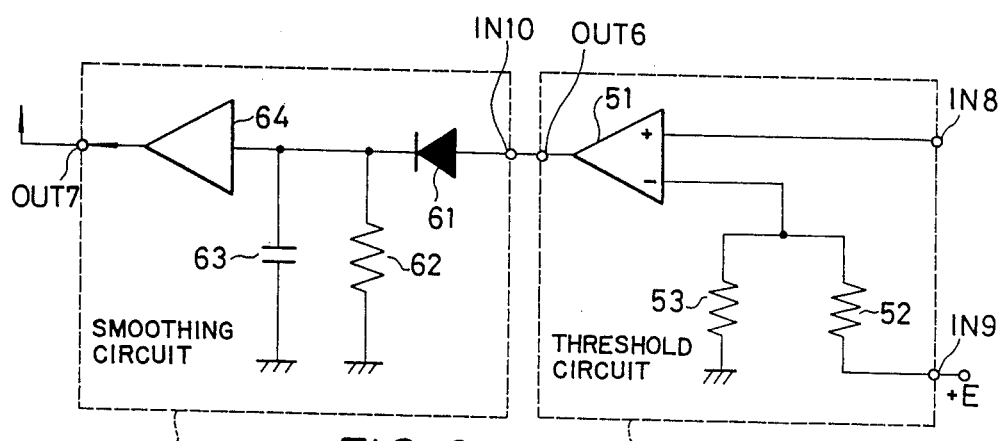
FIG. 6 is a circuit diagram concretely showing a threshold circuit and a smoothing circuit of the demodulation unit.

As shown in FIG. 6, the threshold circuit 50 comprises an operational amplifier 51 and resistors 52 and 53 respectively interconnected as shown in the figure. The resistors 52 and 53 divide a constant voltage +E supplied through a terminal IN9 into the predetermined reference voltage which is supplied to the amplifier 51 as the reference voltage in order to set a voltage level.

The smoothing circuit 60 comprises a diode 61, a resistor 62, a capacitor 63 and an operational amplifier 64 respectively interconnected as shown in FIG. 6.

Next, the function and operation of the communication system will be described hereinunder with reference to signal waveform diagrams as shown in FIGS. 7 and 8.

For transmission at the modulation unit 10, an information signal d(t) is supplied to the multiplier 11 via an input terminal IN1, whereat the signal d(t) is multiplied by the first carrier $\cos\omega_{c1}t$ from an input terminal IN2 to obtain a primary modulated signal $d(t)\cos\omega_{c1}t$ (two-phase PSK modulated signal in this example) having a spectrum as shown by (i) in FIG. 7(a), which is in turn supplied to the adder 12. In the meantime, the second carrier $\cos\omega_{c2}t$ as shown by (ii) in FIG. 7(a) is supplied to the adder 12 via an input terminal IN3, whereat the primary modulated signal $d(t)\cos\omega_{c1}t$ is added to the second carrier $\cos\omega_{c2}t$ to obtain an addition signal d(t)cos$\omega_{c1}$t +cos$\omega_{c2}$t which is supplied to the multiplier 14 in order to spread a spectrum.

The PNG 13 generates a spread code signal P(t) based on a clock signal $S_c$(t) from an input terminal IN4 so as to supply the signal P(t) for the multiplier 14. A pseudo noise code is widely used as the spread code in general, where a maximal period sequence (M sequence) code is used so that the spread code is sometimes called as "pseudo noise code". The spread code signal P(t) generated by the PNG 13 is supplied to the multiplier 14 to be multiplied (spectrum spread) by the addition signal d(t)cos$\omega_{c1}$t +cos$\omega_{c2}$t so as to obtain the spread spectrum signal P(t)[d(t)cos$\omega_{c1}$t +cos$\omega_{c2}$t (hereinafter appropriately indicated by $S_M$(t)). The BPF 15 allows only main lobe of the spread spectrum signal $S_M$(t) to pass and obtain the spread signal $S_M$(t) having a spectrum shown in FIG. 7(b) which is output from an output terminal OUT 1.

The frequency spectrums of the spread spectrum signal will be then described. In the first and second carrier shown in FIG. 7(a), the interval between angular frequencies $\omega_{c1}$ and $\omega_{c2}$ is given by $\{2n(2^n-1)\times T_o\}-1$, wherein $T_o$ is one bit time length of the clock signal $S_C$(t), and n is the number of stages of a shift register assuming that an M sequence code is used at the PNG 13 and the shift register is used for an M sequence code generator (not shown). In the frequency spectrums of the composite spread spectrum signal $S_M$(t) as shown in FIG. 7(b), the frequency interval between sideband waves +$S_{a1}$ and +$S_{a2}$, and between sideband waves +$S_{b1}$ and +$S_{b2}$ is given by $1/\{2n(2^n-1)\times T_o\}$. The sideband waves +$S_{a1}$ to +$S_{an}$, −$S_{a1}$ to −$S_{an}$, and sideband waves +$S_{b1}$ to +$S_{bn}$, −$S_{b1}$ to −$S_{bn}$ are so arranged to alternately appear at equal frequency intervals. FIG. 8 shows the spread spectrum signal whose main lobe is indicated by a solid line at (iii) (between frequencies a and b).

The function and operation of the demodulation unit 20 will be described with reference to FIG. 3B. The composite spread spectrum signal $S_M$(t) (refer to FIG. 7(b)) incoming to an input terminal IN5 is passed through the BPF 21 to remove the frequency components other than the spread spectrum signal, and supplied to the positive (non-inverting) input terminal of the operation amplifier 32 provided in the divider circuit 31 as shown in FIG. 4. The multiplier 33 multiplies the output from the multiplier 35 by the output from the amplifier 32 and supplies its output to the negative (inverting) input terminal of the amplifier 32. As the multiplier 35 outputs a square of the output from the multiplier 34 which squares the output of the amplifier 32, the gain of th amplifier 32 is controlled by the (control) signal supplied to the multiplier 33. Accordingly, the larger the output level of the BPF 21 is, the smaller the amplification degree of the amplifier 32. Namely, the output of the amplifier 32 is compressed such as compression characteristics shown in FIG. 10. In the figure, an incline between points P and shows the compression characteristics which are squared by 2/5 of the input level. The spread signal $S_M$(t) passed through the divider circuit 31 haVing the above characteristics, is supplied to the delay circuit 41 and the adders 42 and 44 of the separating circuit 40 through a terminal IN7 as shown in FIG. 5.

The operational characteristics of the separating circuit 40 such as the comb filter will be simply described with reference to FIGS. 5 and 9. The delay circuits 41 and 43 have the same delay time $\tau$, respectively. The gain regulator 45 have the function reducing the transmission level to half. If the BPF 21 outputs the signal sin$\omega$t, the adder 42 outputs the signal f($\tau$, $\omega$) operated by the following equation (3).

$$\begin{aligned} f(\tau,\omega) &= \sin\omega t + \sin\omega(t-\tau) \\ &= \sqrt{\{2\cos(\omega\tau/2)\}^2} \times \\ & \quad \sin[\omega t - \tan^{-1}\{\sin\omega\tau/(1+\cos\omega t)\}] \\ &= 2 \times |\cos(\omega\tau/2)|\sin[\omega t - \\ & \quad \tan^{-1}\{\sin\omega\tau/(1+\cos\omega t)\}] \end{aligned} \quad (3)$$

The signal f($\tau$, $\omega$) has the adding characteristics as shown in FIG. 9(a).

On the other hand, the subtracter 46 outputs the signal g($\tau$, $\omega$) operated by the following equation (4) and having the subtracting characteristics as shown in FIG. 9(b).

$$\begin{aligned} g(\tau,\omega) &= \tfrac{1}{2}\{\sin\omega t + \sin\omega(t-2\tau)\} - \sin\omega(t-\tau) \\ &= \sqrt{(1-\cos\omega\tau)^2}\sin\{\omega t - \tan^{-1}(B/A)\} \\ &= |1-\cos\omega\tau|\sin\{\omega t - \tan^{-1}(B/A)\} \end{aligned} \quad (4)$$

$$\left(\text{where } \begin{array}{l} A = \tfrac{1}{2}\cos\omega 2\tau - \cos\omega\tau + \tfrac{1}{2} \\ B = \sin\omega\tau - \tfrac{1}{2}\sin 2\omega\tau. \end{array}\right)$$

When the comb filter having the above amplitude characteristics is used as the separating circuit 40, the delay time $\tau$ is set by equation $\tau=(2^n-12)T_o$ in the actual delay circuits 41 and 43. If the top or bottom of the frequency output from the comb filter such as the separating circuit 40 coincides with the sideband frequency of the spread spectrum signal, the composite spread spectrum signal $S_M$(t) can be divided into the spread spectrum signal P(t)d(t)cos$\omega_{c1}$t and the modulated spread code signal P(t)cos$\omega_{c2}$t.

If cos$\omega_{c1}$t is the continuous wave which continues the same phase in the same level as the frequency of P(t) and cos$\omega_{c2}$t is the continuous wave which continues the negative phase in the same level as the frequency of P(t) on the condition that the frequency of P(t) is equal to the delay time $\tau$, the spread spectrum signal $S_1$(t) as an output of the adder 42 is obtained by the equation (5);

$$S_1(t) = \{d(t)+d(t-\tau)\}P(t)\cos\omega_{c1}t \ldots \quad (5)$$

the modulated spread code signal $S_2$(t) as an output of the subtracter 46 is obtained by the equation (6);

$$S_2(t) = 2P(t)\cos\omega_{c2}t + \tfrac{1}{2}\{d(t)+d(t-2\tau)-2d(t-\tau)\}p(-t)\cos\omega_{c1}t \ldots \quad (6)$$

where the second term "$\tfrac{1}{2}\{d(t)+d(t-2\tau)-2d(t-\tau)\}p(t)\cos\omega_{c1}t$" of the equation is the leak component which can not be completely divided, but is very small value so that it is possible to disregard the second term by approximation. Accordingly, $S_2$(t) is obtained by the equation (7);

$$S_2(t) \approx 2P(t)\cos\omega_{c2}t \ldots \quad (7)$$

On the basis of the above operational principle, the spread spectrum signal $S_1$(t) and the modulated spread code signal $S_2$(t) (refer to FIGS. 7(c) and 7(d), respectively) are separated and detected by the circuit 40. The signals $S_1(t)$ and $S_2(t)$ are output through output terminals OUT4 and OUT5 and supplied to the multiplier 22 wherein the signals $S_1(t)$ and $S_2(t)$ are despread by the multiplication. A despreaded output signal $Sp(t)$ is given by the equation (8);

$$\begin{aligned} Sp(t) &= S_1(t) \times S_2(t) \quad (8) \\ &= \{P(t)\}^2\{d(t) + d(t-\tau)\} \times \\ &\quad \{\cos(\omega_{c1} - \omega_{c2})t + \cos(\omega_{c1} + \omega_{c2})t\} \end{aligned}$$

It should be noted that, as P(t) assumes only +1 or −1, and the square output $\{P(t)\}^2$ of the spread code has direct current, the output $[P(t)]2$ can be neglected. Therefore, the despreaded output signal $Sp(t)$ is obtained by the equation (9);

$$Sp(t) = \{d(t) + d(t-\tau)\} \times \{\cos(\omega_{c1} - \omega_{c2})t + \cos(\omega_{c1} + \omega_{c2})t\} \ldots \quad (9)$$

Accordingly, the signal $Sp(t)$ is equal to the demodulated primary modulation signal as shown by (iv) and (v) in FIG. 7(e). If the center frequency of the BPF 23 having the narrow band pass characteristics is set at "$\omega_{c1} - \omega_{c2}$", the demodulated primary modulation signal $Sd(t)$ is given by the equation (10);

$$Sd(t) = \{d(t) + d(t-\tau)\} \times \cos(\omega_{c1} - \omega_{c2})t \ldots \quad (10)$$

The primary modulated signal $Sd(t)$ is output from an output terminal OUT2 and supplied to the multiplier 24 at the same time.

As the multiplier 24 detects an envelope of the signal $Sd(t)$ by a square-law detection, an envelope signal $S_{env}(t)$ is obtained by the equation (11);

$$\begin{aligned} S_{env}(t) &= \tfrac{1}{4}[\{d(t)\}^2 + d(t)d(t-\tau) + \{d(t-\tau)\}^2 + \quad (11) \\ &\quad \{d(t)\}^2\cos 2(\omega_{c1} - \omega_{c2})t + \\ &\quad d(t)d(t-\tau)\cos 2(\omega_{c1} - \omega_{c2})t + \\ &\quad \{d(t-\tau)\}^2\cos 2(\omega_{c1} - \omega_{c2})t] \end{aligned}$$

Though the envelope signal $S_{env}(t)$ is supplied to a terminal IN8 of the threshold circuit 50 shown in FIG. 6 and is forwarded to the smoothing circuit 60, the operational principle of them will be concretely described with reference to FIG. 6.

In FIG. 6, the envelope signal $S_{env}(t)$ is supplied to a non-inverting input of an operational amplifier 51 through the terminal IN8, and an inverting input of the operational amplifier 51 is positively biased at a predetermined voltage which is supplied to a terminal IN9 and divided by resistors 52 and 53, and an output of the operational amplifier 51 is controlled to a diode 61 of the smoothing circuit 60. As a result, the envelope signal $S_{env}(t)$ is allowed to pass the diode 61 is larger than the predetermined value. The envelope signal $S_{env}(t)$ passing through the diode 61 charges the capacitor 63. A control voltage, that is, the voltage across the capacitor 63, is obtained by the charge characteristics at this time. Accordingly, if the diode 61 has an internal resistance $R_f$ in the forward direction, the rise time Ta of the control voltage is obtained by the equation (12);

$$Ta = R_f \cdot C \ldots \quad (12)$$

When the signal current does not flow in the diode 61, the electric charge in the capacitor 63 discharges through the resistor 62. The recovery time Td is given by the equation (13);

$$Td = C \cdot R_3 \ldots \quad (13)$$

where $R_3$ is value of the resistor 62. When the internal resistance Rf is set to "Rf−R3", a control signal $E_C$ having the rapid operation time (rise time) and the constant direct current is obtained at the both sides of the capacitor 63 or at the output side of the operational amplifier 64.

The control signal (voltage) $E_C$ obtained from a terminal OUT7 as a result of the above operation is supplied to a terminal 33a of the multiplier 33 of the divider circuit 31. The multiplier 33 supplies the signal $E_C$ to the negative input terminal of the operational amplifier 32 after multiplication, so that the signal level of the composite spread spectrum signal $S_M(t)$ is controlled.

As mentioned before, FIG. 4 represents the AGC loop in the demodulation unit 20. As easily understood from the operation of the AGC loop, the transmission characteristics between the input terminal IN6 and output terminal OUT3 is 2/5 square of the input signal. Accordingly, an AGC operation is executed by the incline characteristics of 2/5 square. FIG. 10 shows output characteristics corresponding to the input, that is, AGC characteristics. In the figure, a point P denotes the threshold level. For the sake of convenience in the description, small crosstalk components are omitted.

What is claimed is:

1. A spread spectrum communication system for transmitting and receiving a spread spectrum signal by a transmission side modulation unit and a receiving side demodulation unit, wherein
said modulation unit comprises
means for generating a primary modulated signal which is modulated a first carrier by an information signal,
means for generating an additional signal which is obtained by adding said modulated signal and a second carrier,
a spread code generation circuit for generating a spread code signal on the basis of an input clock signal, and
means for generating a composite spread spectrum signal which is composed of a modulated spread code signal and a spread spectrum signal by spreading said additional signal and said spread code signal by multiplication;
said demodulation unit comprises
means for inputting said composite spread spectrum signal,
control means connected to said inputting means for automatically controlling a level of said composite spread spectrum signal responsive to a control signal,
a separating circuit for separating and detecting said modulated spread code signal and said spread spectrum signal from said composite spread spectrum signal,
means for generating a demodulated primarymodulated signal by multiplying and despreading said modulated spread code signal and said spread spectrum signal received from said separating circuit,
means for detecting an envelope signal of said demodulated primary-modulated signal received from said demodulated primary-modulated signal generating means, means for converting said envelope signal detected by said detecting means into a control signal through a smoothing circuit having a time constant, and means for supplying said control signal to said control means.

2. A spread spectrum communication system according to claim 1, wherein said control means comprises an operational amplifier connected to said inputting means, and a multiplier connected between an output and an inverting input of said operational amplifier for multiplying an output signal of said operational amplifier by said control signal so that said level of said composite spread spectrum signal is controlled responsive to the control signal.

3. A spread spectrum communication system according to claim 1, wherein said envelope detection means comprises a multiplier for squaring said demodulated primarymodulated signal according to square characteristics.

4. A spread spectrum communication system according to claim 1, wherein said converting means comprises a threshold circuit connected to said detecting means for allowing to pass said envelope signal detected by said detecting means when a level thereof is larger than a predetermined value, and supply a passed level of said envelope signal to said smoothing circuit which rectifies the passed level of said envelope signal and generate said control signal with said time constant.

5. A spread spectrum communication system according to claim 1, wherein said separating circuit comprises a comb filter having two delay circuits and two adders.

* * * * *